(12) United States Patent
Hoshuyama

(10) Patent No.: US 7,184,079 B2
(45) Date of Patent: Feb. 27, 2007

(54) WHITE BALANCE ADJUSTMENT METHOD, IMAGE PROCESSING APPARATUS AND ELECTRONIC CAMERA

(75) Inventor: Hideo Hoshuyama, Kawasaki (JP)

(73) Assignee: Nikon Corporation, Tokyo (JP)

( * ) Notice: Subject to any disclaimer, the term of this patent is extended or adjusted under 35 U.S.C. 154(b) by 704 days.

(21) Appl. No.: 10/061,293

(22) Filed: Feb. 4, 2002

(65) Prior Publication Data

US 2003/0001958 A1 Jan. 2, 2003

(30) Foreign Application Priority Data

May 24, 2001 (JP) ............................. 2001-155514

(51) Int. Cl.
*H04N 9/73* (2006.01)
*H04N 1/46* (2006.01)

(52) U.S. Cl. .............................. 348/223.1; 348/225.1; 358/516

(58) Field of Classification Search ............. 348/222.1, 348/223.1, 225.1; 382/266, 254, 274; 358/516–518; H04N 5/232
See application file for complete search history.

(56) References Cited

U.S. PATENT DOCUMENTS

| | | | | |
|---|---|---|---|---|
| 5,420,630 A | * | 5/1995 | Takei | 348/223.1 |
| 5,550,587 A | * | 8/1996 | Miyadera | 348/223.1 |
| 5,659,357 A | * | 8/1997 | Miyano | 348/223.1 |
| 6,249,317 B1 | * | 6/2001 | Hashimoto et al. | 348/364 |
| 6,433,818 B1 | * | 8/2002 | Steinberg et al. | 348/161 |
| 6,545,710 B1 | * | 4/2003 | Kubo et al. | 348/223.1 |
| 6,664,973 B1 | * | 12/2003 | Iwamoto et al. | 345/589 |
| 6,727,943 B1 | * | 4/2004 | Juen | 348/223.1 |
| 6,831,687 B1 | * | 12/2004 | Suzuki | 348/251 |
| 2004/0201766 A1 | * | 10/2004 | Funston et al. | 348/333.02 |

FOREIGN PATENT DOCUMENTS

| | | |
|---|---|---|
| JP | 56-36292 A | 4/1981 |
| JP | 5-292533 A | 11/1993 |
| JP | 6-98335 A | 4/1994 |
| JP | 11-298792 | * 10/1999 |
| JP | 2000-224608 A | 8/2000 |

* cited by examiner

*Primary Examiner*—Vivek Srivastava
*Assistant Examiner*—Kelly Jerabek
(74) *Attorney, Agent, or Firm*—Oliff & Berridge, PLC

(57) ABSTRACT

An image-capturing device captures a subject image through an exchangeable lens. A white balance sensor that is set at a position conjugate with the position of the image-capturing device relative to the exchangeable lens to receive the light from the subject image and outputs color signals. A white balance adjustment signal calculation circuit calculates white balance adjustment basic signals based upon the color signals output from the white balance sensor and weighting points in conformance to the photographic range, the number of sets of red color data and the subject brightness value. Adjustment signals to be used for white balance adjustment are determined based upon the weighting points and the adjustment basic signals.

9 Claims, 16 Drawing Sheets

FIG.5A

WEIGHTING POINT FOR ADJUSTMENT SIGNAL OBTAINED THROUGH FULL SURFACE AVERAGING CALCULATING METHOD

| LENS FOCAL LENGTH (mm) | PHOTOGRAPHING DISTANCE (m) | | | | | | | | | | | | |
|---|---|---|---|---|---|---|---|---|---|---|---|---|---|
| | <0.5 | 0.5≦ <0.7 | 0.7≦ <1.0 | 1.0≦ <1.4 | 1.4≦ <2.0 | 2.0≦ <2.8 | 2.8≦ <4.0 | 4.0≦ <5.7 | 5.7≦ <8.0 | 8.0≦ <11.3 | 11.3≦ <16.0 | 16.0≦ <22.6 | 22.6≦ |
| <15 | 0 | 0 | 0 | 0 | 0 | 0 | 0 | 0 | 0 | 0 | 0 | 0 | 0 |
| 15≦ <18 | -3 | 0 | 0 | 0 | 0 | 0 | 0 | 0 | 0 | 0 | 0 | 0 | 0 |
| 18≦ <20 | -6 | 0 | 0 | 0 | 0 | 0 | 0 | 0 | 0 | 0 | 0 | 0 | 0 |
| 20≦ <24 | -9 | -1 | 0 | 0 | 0 | 0 | 0 | 0 | 0 | 0 | 0 | 0 | 0 |
| 24≦ <28 | -13 | -5 | 0 | 0 | 0 | 0 | 0 | 0 | 0 | 0 | 0 | 0 | 0 |
| 28≦ <35 | -16 | -10 | -1 | 0 | 0 | 0 | 0 | 0 | 0 | 0 | 0 | 0 | 0 |
| 35≦ <50 | -19 | -15 | -9 | 0 | 0 | 0 | 0 | 0 | 0 | 0 | 0 | 0 | 0 |
| 50≦ <85 | -23 | -21 | -17 | -11 | -3 | 0 | 0 | 0 | 0 | 0 | 0 | 0 | 0 |
| 85≦ <105 | -25 | -23 | -21 | -17 | -11 | -3 | 0 | 0 | 0 | 0 | 0 | 0 | 0 |
| 105≦ <135 | -26 | -25 | -22 | -19 | -15 | -9 | 0 | 0 | 0 | 0 | 0 | 0 | 0 |
| 135≦ <180 | -27 | -26 | -24 | -22 | -19 | -14 | -7 | 0 | 0 | 0 | 0 | 0 | 0 |
| 180≦ <200 | -28 | -27 | -25 | -23 | -21 | -17 | -11 | -3 | 0 | 0 | 0 | 0 | 0 |
| 200≦ <300 | -28 | -27 | -26 | -25 | -23 | -20 | -16 | -10 | -1 | 0 | 0 | 0 | 0 |
| 300≦ <400 | -28 | -28 | -27 | -26 | -25 | -23 | -20 | -15 | -9 | -1 | 0 | 0 | 0 |
| 400≦ <500 | -29 | -28 | -28 | -27 | -26 | -24 | -22 | -19 | -14 | -7 | 0 | 0 | 0 |
| 500≦ <600 | -29 | -29 | -28 | -28 | -27 | -25 | -23 | -21 | -17 | -11 | -1 | 5 | 10 |
| 600≦ <800 | -29 | -29 | -29 | -28 | -27 | -26 | -25 | -23 | -20 | -15 | -7 | 8 | 12 |
| 800≦ | -29 | -29 | -29 | -29 | -28 | -26 | -25 | -24 | -22 | -19 | -11 | 5 | 10 |
| | -29 | -29 | -29 | -29 | -29 | -27 | -26 | -25 | -24 | -19 | -15 | 0 | 0 |
| | -29 | -29 | -29 | -29 | -29 | -27 | -26 | -25 | -24 | -19 | -15 | 0 | 0 |
| | -29 | -29 | -29 | -29 | -29 | -27 | -26 | -25 | -24 | -19 | -15 | -1 | -7 |
| | -29 | -29 | -29 | -29 | -29 | -27 | -26 | -25 | -24 | -19 | -15 | -7 | 0 |

FIG.5B

WEIGHTING POINT FOR ADJUSTMENT SIGNAL OBTAINED THROUGH MULTIPLE DIVISION WHITE DETECTION CALCULATING METHOD

| LENS FOCAL LENGTH (mm) | PHOTOGRAPHING DISTANCE (m) | | | | | | | | | | | | |
|---|---|---|---|---|---|---|---|---|---|---|---|---|---|
| | <0.5 | 0.5≦ <0.7 | 0.7≦ <1.0 | 1.0≦ <1.4 | 1.4≦ <2.0 | 2.0≦ <2.8 | 2.8≦ <4.0 | 4.0≦ <5.7 | 5.7≦ <8.0 | 8.0≦ <11.3 | 11.3≦ <16.0 | 16.0≦ <22.6 | 22.6≦ |
| <15 | o | o | o | o | o | o | o | o | o | o | o | o | o |
| 15≦ <18 | o | o | o | o | o | o | o | o | o | o | o | o | o |
| 18≦ <20 | o | o | o | o | o | o | o | o | o | o | o | o | o |
| 20≦ <24 | o | o | o | o | o | o | o | o | o | o | o | o | o |
| 24≦ <28 | o | o | o | o | o | o | o | o | o | o | o | o | o |
| 28≦ <35 | o | o | o | o | o | o | o | o | o | o | o | o | o |
| 35≦ <50 | o | o | o | o | o | o | o | o | o | o | o | o | o |
| 50≦ <85 | o | o | o | o | o | o | o | o | o | o | o | o | o |
| 85≦ <105 | o | o | o | o | o | o | o | o | o | o | o | o | o |
| 105≦ <135 | o | o | o | o | o | o | o | o | o | o | o | o | o |
| 135≦ <180 | o | o | o | o | o | o | o | o | o | o | o | o | o |
| 180≦ <200 | o | o | o | o | o | o | o | o | o | o | o | o | o |
| 200≦ <300 | o | o | o | o | o | o | o | o | o | o | o | o | o |
| 300≦ <400 | o | o | o | o | o | o | o | o | o | o | o | o | o |
| 400≦ <500 | o | o | o | o | o | o | o | o | o | o | o | o | o |
| 500≦ <600 | o | o | o | o | o | o | o | o | o | o | o | o | o |
| 600≦ <800 | o | o | o | o | o | o | o | o | o | o | o | o | o |
| 800≦ | o | o | o | o | o | o | o | o | o | o | o | o | o |

FIG.5C

WEIGHTING POINT FOR ADJUSTMENT SIGNAL OBTAINED THROUGH MULTIPLE DIVISION SKIN COLOR DETECTION CALCULATING METHOD

| LENS FOCAL LENGTH (mm) | PHOTOGRAPHING DISTANCE (m) | | | | | | | | | | | |
|---|---|---|---|---|---|---|---|---|---|---|---|---|
| | <0.5 | 0.5≦ <0.7 | 0.7≦ <1.0 | 1.0≦ <1.4 | 1.4≦ <2.0 | 2.0≦ <2.8 | 2.8≦ <4.0 | 4.0≦ <5.7 | 5.7≦ <8.0 | 8.0≦ <11.3 | 11.3≦ <18.0 | 16.0≦ <22.6 | 22.6≦ |
| <15 | 8 | -18 | -45 | -45 | -45 | -45 | -45 | -45 | -45 | -45 | -45 | -45 | -45 |
| 15≦ <18 | 22 | 1 | -29 | -45 | -45 | -45 | -45 | -45 | -45 | -45 | -45 | -45 | -45 |
| 18≦ <20 | 28 | 10 | -16 | -45 | -45 | -45 | -45 | -45 | -45 | -45 | -45 | -45 | -45 |
| 20≦ <24 | 34 | 19 | -4 | -35 | -45 | -45 | -45 | -45 | -45 | -45 | -45 | -45 | -45 |
| 24≦ <28 | 15 | 27 | 8 | -18 | -45 | -45 | -45 | -45 | -45 | -45 | -45 | -45 | -45 |
| 28≦ <35 | -6 | 35 | 19 | -3 | -34 | -45 | -45 | -45 | -45 | -45 | -45 | -45 | -45 |
| 35≦ <50 | -31 | -1 | 33 | 17 | -6 | -39 | -45 | -45 | -45 | -45 | -45 | -45 | -45 |
| 50≦ <85 | -45 | -39 | -12 | 26 | 23 | 2 | -27 | -45 | -45 | -45 | -45 | -45 | -45 |
| 85≦ <105 | -45 | -45 | -39 | -12 | 27 | 23 | 2 | -27 | -45 | -45 | -45 | -45 | -45 |
| 105≦ <135 | -45 | -45 | -45 | -31 | -1 | 33 | 17 | -6 | -39 | -45 | -45 | -45 | -45 |
| 135≦ <180 | -45 | -45 | -45 | -45 | -26 | 7 | 30 | 12 | -12 | -45 | -45 | -45 | -45 |
| 180≦ <200 | -45 | -45 | -45 | -45 | -39 | -12 | 27 | 23 | 2 | -27 | -45 | -45 | -45 |
| 200≦ <300 | -45 | -45 | -45 | -45 | -45 | -34 | -5 | 35 | 19 | -3 | -35 | -45 | -45 |
| 300≦ <400 | -45 | -45 | -45 | -45 | -45 | -45 | -33 | -4 | 34 | 18 | -4 | -36 | -45 |
| 400≦ <500 | -45 | -45 | -45 | -45 | -45 | -45 | -45 | -26 | 6 | 30 | 13 | -12 | -45 |
| 500≦ <600 | -45 | -45 | -45 | -45 | -45 | -45 | -45 | -41 | -14 | 24 | 24 | 4 | -25 |
| 600≦ <800 | -45 | -45 | -45 | -45 | -45 | -45 | -45 | -45 | -33 | -4 | 34 | 18 | -4 |
| 800≦ | -45 | -45 | -45 | -45 | -45 | -45 | -45 | -45 | -45 | -26 | 6 | 30 | 13 |

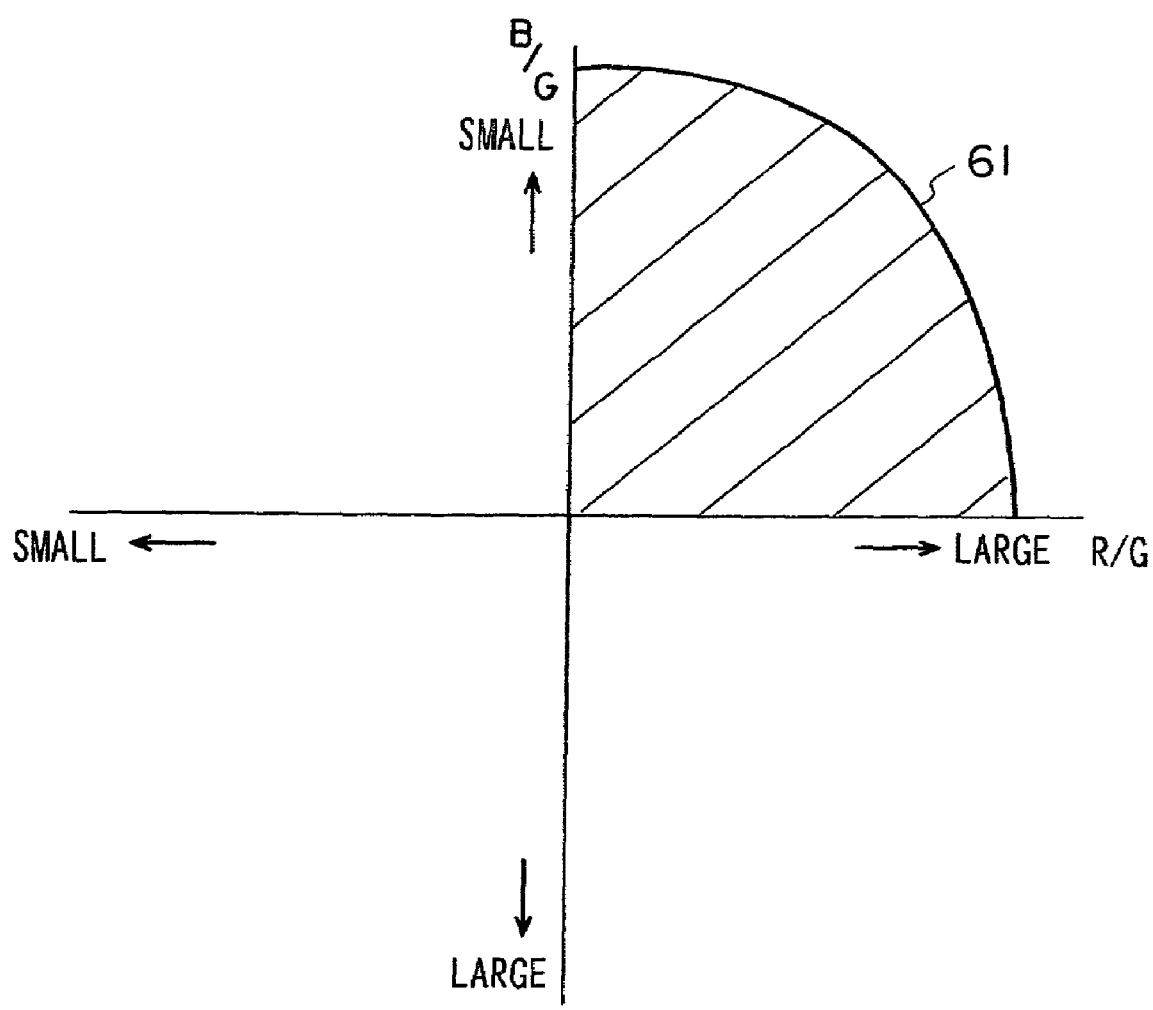

FIG.7A

| WEIGHTING POINT FOR ADJUSTMENT SIGNAL OBTAINED THROUGH FULL SURFACE AVERAGING CALCULATING METHOD | NUMBER OF SETS OF RED COLOR DATA | SUBJECT BRIGHTNESS BV | | | | | | | | | | | |
|---|---|---|---|---|---|---|---|---|---|---|---|---|---|
| | | <1.4 | 1.4≤<1.6 | 1.6≤<1.8 | 1.8≤<2.0 | 2.0≤<2.2 | 2.2≤<2.4 | 2.4≤<2.6 | 2.6≤<2.8 | 2.8≤<3.8 | 3.8≤<4.0 | 4.0≤<4.2 | 4.2≤<4.4 |
| | <30 | 0 | 0 | 0 | 0 | 0 | 0 | 0 | 0 | 0 | 0 | 0 | 0 |
| | 30≤<35 | 0 | 0 | -1 | -1 | -2 | -3 | -3 | -4 | -4 | -5 | -6 | -7 |
| | 35≤<40 | 1 | 0 | -1 | -2 | -4 | -5 | -6 | -7 | -8 | -10 | -12 | -13 |
| | 40≤<45 | 2 | 0 | -2 | -3 | -5 | -7 | -9 | -10 | -12 | -15 | -17 | -20 |
| | 45≤<50 | 3 | 1 | -2 | -4 | -7 | -9 | -11 | -14 | -16 | -19 | -23 | -26 |
| | 50≤<55 | 3 | 1 | -3 | -5 | -8 | -11 | -14 | -17 | -20 | -24 | -28 | -32 |
| | 55≤<60 | 4 | 1 | -3 | -6 | -10 | -13 | -17 | -20 | -24 | -29 | -34 | -39 |
| | 60≤<65 | 5 | 2 | -4 | -7 | -11 | -16 | -19 | -24 | -27 | -33 | -39 | -45 |
| | 65≤<70 | 6 | 2 | -4 | -8 | -13 | -18 | -22 | -27 | -31 | -38 | -45 | -52 |
| | 70≤<75 | 6 | 2 | -5 | -9 | -14 | -20 | -25 | -30 | -35 | -43 | -50 | -58 |
| | 75≤<80 | 7 | 2 | -5 | -10 | -16 | -22 | -27 | -34 | -39 | -47 | -56 | -64 |
| | 80≤<85 | 8 | 2 | -5 | -11 | -17 | -24 | -30 | -37 | -43 | -52 | -61 | -71 |
| | 85≤<90 | 9 | 3 | -5 | -12 | -19 | -26 | -33 | -40 | -47 | -57 | -67 | -77 |
| | 90≤ | 10 | 3 | -5 | -13 | -20 | -28 | -35 | -43 | -50 | -61 | -72 | -83 |

FIG.7B

| NUMBER OF SETS OF RED COLOR DATA | SUBJECT BRIGHTNESS (BV) | | | | | | | | | | | |
|---|---|---|---|---|---|---|---|---|---|---|---|---|
| | 4.4≤ <4.6 | 4.6≤ <4.8 | 4.8≤ <5.0 | 5.0≤ <5.2 | 5.2≤ <6.2 | 6.2≤ <6.4 | 6.4≤ <6.6 | 6.6≤ <6.8 | 6.8≤ <7.0 | 7.0≤ <7.2 | 7.3≤ <7.4 | 7.4≤ |
| <30 | 0 | 0 | 0 | 0 | 0 | 0 | 0 | 0 | 0 | 0 | 0 | 0 |
| 30≤ <35 | -8 | -9 | -9 | -10 | -10 | -10 | -10 | -10 | -10 | -10 | -10 | -10 |
| 35≤ <40 | -15 | -17 | -18 | -20 | -20 | -20 | -20 | -20 | -20 | -20 | -20 | -20 |
| 40≤ <45 | -22 | -25 | -27 | -30 | -30 | -30 | -30 | -30 | -30 | -30 | -30 | -30 |
| 45≤ <50 | -29 | -33 | -36 | -40 | -40 | -40 | -40 | -40 | -40 | -40 | -40 | -40 |
| 50≤ <55 | -37 | -41 | -45 | -49 | -49 | -49 | -49 | -49 | -49 | -49 | -49 | -49 |
| 55≤ <60 | -44 | -49 | -54 | -59 | -59 | -59 | -59 | -59 | -59 | -59 | -59 | -59 |
| 60≤ <65 | -51 | -57 | -63 | -69 | -69 | -69 | -69 | -69 | -69 | -69 | -69 | -69 |
| 65≤ <70 | -58 | -65 | -72 | -79 | -79 | -79 | -79 | -79 | -79 | -79 | -79 | -79 |
| 70≤ <75 | -66 | -73 | -81 | -88 | -88 | -88 | -88 | -88 | -88 | -88 | -88 | -88 |
| 75≤ <80 | -73 | -81 | -90 | -98 | -98 | -98 | -98 | -98 | -98 | -98 | -98 | -98 |
| 80≤ <85 | -80 | -89 | -99 | -108 | -108 | -108 | -108 | -108 | -108 | -108 | -108 | -108 |
| 85≤ <90 | -87 | -97 | -108 | -118 | -118 | -118 | -118 | -118 | -118 | -118 | -118 | -118 |
| 90≤ | -94 | -105 | -116 | -127 | -127 | -127 | -127 | -127 | -127 | -127 | -127 | -127 |

WEIGHTING POINT FOR ADJUSTMENT SIGNAL OBTAINED THROUGH FULL SURFACE AVERAGING CALCULATING METHOD

FIG.7C

WEIGHTING POINT FOR ADJUSTMENT SIGNAL OBTAINED THROUGH MULTIPLE DIVISION WHITE DETECTION CALCULATING METHOD

| NUMBER OF SETS OF RED COLOR DATA | SUBJECT BRIGHTNESS BV) | | | | | | | | | | | | | | | |
|---|---|---|---|---|---|---|---|---|---|---|---|---|---|---|---|---|
| | <1.4 | 1.4≦ <1.6 | 1.6≦ <1.8 | 1.8≦ <2.0 | 2.0≦ <2.2 | 2.2≦ <2.4 | 2.4≦ <2.6 | 2.6≦ <2.8 | 2.8≦ <3.8 | 3.8≦ <4.0 | 4.0≦ <4.2 | 4.2≦ <4.4 |
| <30 | 0 | -1 | 0 | 0 | 0 | 0 | 0 | 0 | 1 | 0 | 0 | 0 | 0 |
| 30≦ <35 | -1 | -2 | -1 | -1 | -1 | -1 | -1 | -1 | 0 | 0 | 0 | 0 | 0 |
| 35≦ <40 | -2 | -3 | -2 | -2 | -1 | -1 | -1 | -1 | 0 | 0 | 0 | 0 | 0 |
| 40≦ <45 | -3 | -4 | -3 | -2 | -2 | -1 | -1 | -1 | 0 | 0 | 0 | 0 | 0 |
| 45≦ <50 | -4 | -4 | -3 | -3 | -2 | -2 | -2 | -1 | 0 | 0 | 0 | 0 | 0 |
| 50≦ <55 | -4 | -5 | -4 | -4 | -3 | -2 | -2 | -1 | 0 | 0 | 0 | 0 | 0 |
| 55≦ <60 | -5 | -6 | -5 | -5 | -4 | -3 | -2 | -2 | 0 | 0 | 0 | 1 | 1 |
| 60≦ <65 | -6 | -6 | -5 | -6 | -4 | -3 | -2 | -1 | -1 | 0 | 0 | 1 | 1 |
| 65≦ <70 | -7 | -7 | -6 | -6 | -5 | -4 | -3 | -2 | -1 | 0 | 1 | 1 | 1 |
| 70≦ <75 | -7 | -8 | -7 | -7 | -6 | -4 | -3 | -2 | -1 | 0 | 1 | 1 | 2 |
| 75≦ <80 | -8 | -8 | -8 | -8 | -7 | -5 | -3 | -2 | -1 | 0 | 1 | 1 | 2 |
| 80≦ <85 | -9 | -9 | -9 | -9 | -8 | -5 | -3 | -2 | -1 | 0 | 1 | 1 | 2 |
| 85≦ <90 | -10 | -10 | -10 | -9 | -9 | -5 | -3 | -2 | -1 | 0 | 1 | 1 | 2 |
| 90≦ | -10 | -10 | -10 | -9 | -9 | -5 | -3 | -2 | -1 | 1 | 2 | 2 | 3 |

FIG. 7D

| NUMBER OF SETS OF RED COLOR DATA | SUBJECT BRIGHTNESS BV | | | | | | | | | | | |
|---|---|---|---|---|---|---|---|---|---|---|---|---|
| | 4.4≤<br><4.6 | 4.6≤<br><4.8 | 4.8≤<br><5.0 | 5.0≤<br><5.2 | 5.2≤<br><6.2 | 6.2≤<br><6.4 | 6.4≤<br><6.6 | 6.6≤<br><6.8 | 6.8≤<br><7.0 | 7.0≤<br><7.2 | 7.3≤<br><7.4 | 7.4≤ |
| <30 | 0 | 0 | 0 | 0 | 0 | 0 | 0 | 0 | 0 | 0 | 0 | 0 |
| 30≤<35 | 0 | 0 | 0 | 0 | 0 | 0 | 1 | 1 | 1 | 1 | 1 | 1 |
| 35≤<40 | 0 | 1 | 1 | 1 | 1 | 1 | 2 | 2 | 2 | 2 | 3 | 3 |
| 40≤<45 | 1 | 1 | 2 | 2 | 2 | 2 | 3 | 3 | 3 | 4 | 4 | 4 |
| 45≤<50 | 1 | 2 | 2 | 3 | 3 | 3 | 4 | 4 | 5 | 5 | 6 | 6 |
| 50≤<55 | 2 | 2 | 3 | 3 | 3 | 4 | 5 | 5 | 6 | 7 | 7 | 7 |
| 55≤<60 | 2 | 3 | 4 | 4 | 5 | 5 | 6 | 6 | 7 | 8 | 9 | 9 |
| 60≤<65 | 3 | 3 | 5 | 5 | 6 | 6 | 7 | 8 | 9 | 10 | 10 | 10 |
| 65≤<70 | 3 | 4 | 5 | 6 | 6 | 7 | 8 | 9 | 10 | 11 | 12 | 12 |
| 70≤<75 | 4 | 5 | 6 | 7 | 7 | 8 | 9 | 10 | 11 | 13 | 13 | 13 |
| 75≤<80 | 4 | 5 | 7 | 8 | 8 | 9 | 10 | 11 | 13 | 14 | 15 | 15 |
| 80≤<85 | 5 | 6 | 8 | 9 | 9 | 10 | 11 | 12 | 14 | 16 | 16 | 16 |
| 85≤<90 | | 7 | 9 | 10 | 10 | 11 | 12 | 13 | 15 | 17 | 18 | 18 |
| 90≤ | | | 9 | 10 | 10 | 13 | 13 | 15 | 17 | 19 | 20 | 20 |

WEIGHTING POINT FOR ADJUSTMENT SIGNAL OBTAINED THROUGH MULTIPLE DIVISION WHITE DETECTION CALCULATING METHOD

FIG.7E

| Weighting point for adjustment signal obtained through multiple division skin color detection calculating method | Number of sets of red color data | Subject Brightness BV | | | | | | | | | | | |
|---|---|---|---|---|---|---|---|---|---|---|---|---|---|
| | | <1.4 | 1.4≤<1.6 | 1.6≤<1.8 | 1.8≤<2.0 | 2.0≤<2.2 | 2.2≤<2.4 | 2.4≤<2.6 | 2.6≤<2.8 | 2.8≤<3.8 | 3.8≤<4.0 | 4.0≤<4.2 | 4.2≤<4.4 |
| | <30 | 0 | 0 | 0 | 0 | 0 | 0 | 0 | 1 | 0 | 0 | 0 | 0 |
| | 30≤<35 | 0 | 0 | 0 | 0 | 0 | 0 | 0 | 0 | 0 | 0 | 0 | 0 |
| | 35≤<40 | 0 | 0 | 0 | 0 | 0 | 0 | 0 | 0 | 0 | 0 | 0 | 0 |
| | 40≤<45 | 0 | 0 | 0 | 0 | 0 | 0 | 0 | 0 | 0 | 0 | 0 | 0 |
| | 45≤<50 | 0 | 0 | 0 | 0 | 0 | 0 | 0 | 0 | 0 | 0 | 0 | 0 |
| | 50≤<55 | 0 | 0 | 0 | 0 | 0 | 0 | 0 | 0 | 0 | 0 | 0 | 0 |
| | 55≤<60 | 0 | 0 | 0 | 0 | 0 | 0 | 0 | 0 | 0 | 0 | 0 | 0 |
| | 60≤<65 | 0 | 0 | 0 | 0 | 0 | 0 | 0 | 0 | 0 | 0 | 0 | 0 |
| | 65≤<70 | 0 | 0 | 0 | 0 | 0 | 0 | 0 | 0 | 0 | 0 | 0 | 0 |
| | 70≤<75 | 0 | 0 | 0 | 0 | 0 | 0 | 0 | 0 | 0 | 0 | 0 | 0 |
| | 75≤<80 | 0 | 0 | 0 | 0 | 0 | 0 | 0 | 0 | 0 | 0 | 0 | 0 |
| | 80≤<85 | 0 | 0 | 0 | 0 | 0 | 0 | 0 | 0 | 0 | 0 | 0 | 0 |
| | 85≤<90 | 0 | 0 | 0 | 0 | 0 | 0 | 0 | 0 | 0 | 0 | 0 | 0 |
| | 90≤ | 0 | 0 | 0 | 0 | 0 | 0 | 0 | 0 | 0 | 0 | 0 | 0 |

FIG.7F

WEIGHTING POINT FOR ADJUSTMENT SIGNAL OBTAINED THROUGH MULTIPLE DIVISION SKIN COLOR DETECTION CALCULATING METHOD

| NUMBER OF SETS OF RED COLOR DATA | SUBJECT BRIGHTNESS BV | | | | | | | | | | | |
|---|---|---|---|---|---|---|---|---|---|---|---|---|
| | 4.4≤<br><4.6 | 4.6≤<br><4.8 | 4.8≤<br><5.0 | 5.0≤<br><5.2 | 5.2≤<br><6.2 | 6.2≤<br><6.4 | 6.4≤<br><6.6 | 6.6≤<br><6.8 | 6.8≤<br><7.0 | 7.0≤<br><7.2 | 7.3≤<br><7.4 | 7.4≤ |
| <30 | 0 | 0 | 0 | 0 | 0 | 0 | 0 | 0 | 0 | 0 | 0 | 0 |
| 30≤<35 | 0 | 0 | 0 | 0 | 0 | 0 | 0 | 0 | 0 | 0 | 0 | 0 |
| 35≤<40 | 0 | 0 | 0 | 0 | 0 | 0 | 0 | 0 | 0 | 1 | 1 | 1 |
| 40≤<45 | 0 | 0 | 0 | 0 | 0 | 0 | 0 | 1 | 1 | 2 | 2 | 2 |
| 45≤<50 | 0 | 0 | 0 | 0 | 0 | 0 | 1 | 1 | 2 | 2 | 3 | 3 |
| 50≤<55 | 0 | 0 | 0 | 0 | 0 | 0 | 1 | 2 | 2 | 3 | 3 | 3 |
| 55≤<60 | 0 | 0 | 0 | 0 | 0 | 0 | 1 | 2 | 3 | 4 | 4 | 4 |
| 60≤<65 | 0 | 0 | 0 | 0 | 0 | 0 | 2 | 3 | 3 | 4 | 5 | 5 |
| 65≤<70 | 0 | 0 | 0 | 0 | 0 | 1 | 2 | 3 | 4 | 5 | 6 | 6 |
| 70≤<75 | 0 | 0 | 0 | 0 | 0 | 1 | 2 | 3 | 4 | 6 | 6 | 6 |
| 75≤<80 | 0 | 0 | 0 | 0 | 0 | 1 | 2 | 4 | 5 | 6 | 7 | 7 |
| 80≤<85 | 0 | 0 | 0 | 0 | 0 | 0 | 3 | 4 | 5 | 7 | 8 | 8 |
| 85≤<90 | 0 | 0 | 0 | 0 | 0 | 0 | 3 | 5 | 6 | 8 | 9 | 9 |
| 90≤ | 0 | 0 | 0 | 0 | 0 | 1 | 3 | 5 | 7 | 9 | 10 | 10 |

FIG.8

| | SUBJECT BRIGHTNESS (BV) | | | | | | | | | | | | | | | | | | |
|---|---|---|---|---|---|---|---|---|---|---|---|---|---|---|---|---|---|---|---|
| | <1.4 | 1.4≤ <1.6 | 1.6≤ <1.8 | 1.8≤ <2.0 | 2.0≤ <2.2 | 2.2≤ <2.4 | 2.4≤ <2.6 | 2.6≤ <2.8 | 2.8≤ <3.8 | 3.8≤ <4.0 | 4.0≤ <4.2 | 4.2≤ <4.4 | 4.4≤ <4.6 | 4.6≤ <4.8 | 4.8≤ <5.0 | 5.0≤ <5.2 | 5.2≤ <6.2 | 6.2≤ <6.4 | 6.4≤ <6.6 | 6.6≤ <6.8 | 6.8≤ <7.0 | 7.0≤ <7.2 | 7.2≤ <7.3 | 7.3≤ <7.4 | 7.4≤ |
| WEIGHTING POINT FOR ADJUSTMENT SIGNAL OBTAINED THROUGH FULL SURFACE AVERAGING CALCULATING METHOD | 13 | 14 | 16 | 17 | 19 | 20 | 22 | 23 | 25 | 23 | 21 | 19 | 17 | 15 | 13 | 11 | 10 | 8 | 7 | 6 | 5 | 3 | 2 | 1 |
| WEIGHTING POINT FOR ADJUSTMENT SIGNAL OBTAINED THROUGH MULTIPLE DIVISION WHITE DETECTION CALCULATING METHOD | 0 | 0 | 0 | 0 | 0 | 0 | 0 | 0 | 0 | 1 | 2 | 3 | 5 | 6 | 7 | 8 | 10 | 11 | 13 | 14 | 16 | 18 | 19 | 21 |
| WEIGHTING POINT FOR ADJUSTMENT SIGNAL OBTAINED THROUGH MULTIPLE DIVISION SKIN COLOR DETECTION CALCULATING METHOD | −17 | −15 | −13 | −11 | −9 | −7 | −5 | −3 | 0 | 1 | 2 | 3 | 5 | 6 | 7 | 8 | 10 | 10 | 10 | 10 | 10 | 10 | 10 | 10 |

WHITE BALANCE ADJUSTMENT METHOD, IMAGE PROCESSING APPARATUS AND ELECTRONIC CAMERA

INCORPORATION BY REFERENCE

The disclosure of the following priority application is incorporated herein by reference: Japanese Patent Application No. 2001-155514 filed May 24, 2001

BACKGROUND OF THE INVENTION

1. Field of the Invention

The present invention relates to an electronic camera that captures a subject image and records image data.

2. Description of the Related Art

There are electronic cameras in the known art having an image-capturing device and an image processing circuit. The image capturing device captures a subject image having passed through a photographic lens with a CCD or the like and outputs image data. The image processing circuit implements image processing such as white balance adjustment and γ control by adjusting the amplification gain to be applied to the image data output by the image-capturing device. In the image processing circuit, the image processing is performed by calculating parameters such as the R-gain and the B-gain for the white balance adjustment, the gradation curve for the γ control or the like using predetermined algorithms based upon the image data output from the image-capturing device.

The white balance adjustment may be performed in an electronic camera by adopting one of the following three methods in the known art, for instance. The first method is disclosed in Japanese Laid-Open Patent Publication No. S56-36292. A white balance adjustment coefficient is calculated so that the average value of color information corresponding to the main subject, the background and the like obtained through an image-capturing operation becomes an achromatic color that may be white or gray. Then, a white balance adjustment is implemented on the image data by using the adjustment coefficient thus calculated.

The second method is disclosed in Japanese Laid-Open Patent Publication No. H 5-292533. An image plane to be photographed is divided into a plurality of small areas and a small area whose average value of the color information is within a predetermined range is extracted. Then, a white balance adjustment coefficient is calculated so that the average value of the color information corresponding to the extracted small area to indicate an achromatic color and a white balance adjustment is implemented on the image data using the adjustment coefficient thus calculated.

The third method is disclosed in Japanese Laid-Open Patent Publication No. 2000-224608. A small area indicating a specific color is extracted from the photographic image plane, a white balance adjustment coefficient is calculated so as to set the color in the extracted small area to a specific color and a white balance adjustment is performed on the image data using the adjustment coefficient thus calculated.

While each of the white balance adjustment methods described above has its advantages, they all have problems to be addressed. Accordingly, Japanese Laid-Open Patent Publication No. H 6-98335 discloses a technology through which one of the three white balance adjustment signal calculation methods is selected. However, there is a concern that as the white balance adjustment value may change greatly over an area where a borderline of judgment performed to select one of the methods is present, the image having undergone the white balance adjustment may appear unnatural in such a case. In addition, an image with unnatural color results from an error in the selection judgment process and thus, a white balance adjustment failure occurs readily.

SUMMARY OF THE INVENTION

The present invention is directed to a technique to prevent a white balance adjustment failure by weighting a plurality of white balance adjustment gains through an analysis of the scene being photographed.

In a white balance adjustment method according to the present invention, chromaticity of a subject is detected by using an image-capturing signal of an image of the subject that has been photographed, a scene is analyzed by using the image-capturing signal, a white balance adjustment gain for the image-capturing signal is calculated based upon the detected chromaticity of the subject and the results of analyzing the scene, and a white balance adjustment is performed by applying the white balance adjustment gain to the image-capturing signal.

An image processing apparatus according to the present invention comprises a chromaticity detection unit that detects chromaticity of a subject by using an image-capturing signal of an image of the subject that has been photographed, a scene analysis unit that analyzes a scene by using the image-capturing signal, a gain calculation unit that calculates a white balance adjustment gain for the image-capturing signal based upon detected chromaticity of the subject and the results of analyzing the scene, and a white balance adjustment unit that performs a white balance adjustment by applying the white balance adjustment gains to the image-capturing signal.

An electronic camera according to the present invention comprises an image-capturing device that captures a subject image passing through a photographic lens and outputs an image-capturing signal, and the above-noted image processing apparatus.

An electronic camera according to the present invention comprises an image-capturing device that captures a subject image passing through a photographic lens and outputs an image-capturing signal, a chromaticity detection unit that detects chromaticity of the subject by using the image-capturing signal, a gain calculation unit that calculates first and second gains by using different algorithms based upon the chromaticity detected by the chromaticity detection unit, a scene analysis unit that analyzes a scene to be photographed, a weighting value calculation unit that calculates first and second weighting values each for the first and second gains based on the results of analyzing the scene, a final gain calculation unit that calculates a white balance adjustment gain for the image-capturing signal based upon the first and second gains to which the first and second weighting values have been applied respectively, and a white balance adjustment unit that performs a white balance adjustment by applying the white balance adjustment gains to the image-capturing signal.

The weighting value calculation unit calculates the weighting values so as to give dominance to either the first gain or the second gain. In this case, the weighting value calculation unit weights the first gain and the second gain by providing different coefficients for the first gain and the second gain, with a positive coefficient set for one of the gains that is to be given dominance and a negative coefficient with a larger absolute value than the positive coefficient provided for the other gain. The weighting value calculation unit may include a table of a relationship between results of analyzing the scene being photographed and weighting values.

The gain calculation unit may be constituted so as to calculate a first gain by using a white balance adjustment signal calculating method achieved by averaging color signals over an entire image plane, a second gain by using a white balance adjustment signal calculating method achieved through multiple division white detection, and a third gain by using a white balance adjustment signal calculating method achieved through multiple division skin color detection. The weighting value calculation unit analyzes a scene to be photographed by using a photographic range analysis method, a red color area analysis method and a brightness value analysis method, respectively and calculates, for the individual results of analyzing the scene, a first weighting value for a first gain, a second weighting value for a second gain and a third weighting value for a third gain. The final gain calculation unit calculates the white balance gain to the image-capturing signals based upon the first gain to which the first weighting value has applied the second gain to which the second weighting value has applied and the third gain to which the third weighting value has applied.

The present invention can apply to a computer-readable computer program product containing a control program for white balance adjustment. The control program comprises instruction for detecting chromaticity of a subject by using an image-capturing signal of an image of the subject that has been photographed, instruction for analyzing the scene by using the image-capturing signal, instruction for calculating a white balance adjustment gain for the image-capturing signal based upon the detected chromaticity of the subject and the results of analyzing the scene, and instruction for performing a white balance adjustment by applying the white balance adjustment gain to the image-capturing signal.

A computer-readable computer program product may be a recording medium or a carrier wave in which the control program is embodied.

BRIEF DESCRIPTION OF THE DRAWINGS

FIGS. 5A–5C show tables of the first weighting points.
FIG. 6 is a diagram of a chromaticity coordinate system.
FIGS. 7A–7F show tables of the second weighting points.
FIG. 8 shows a table of the third weighting points.

DESCRIPTION OF PREFERRED EMBODIMENTS

Figure 1:
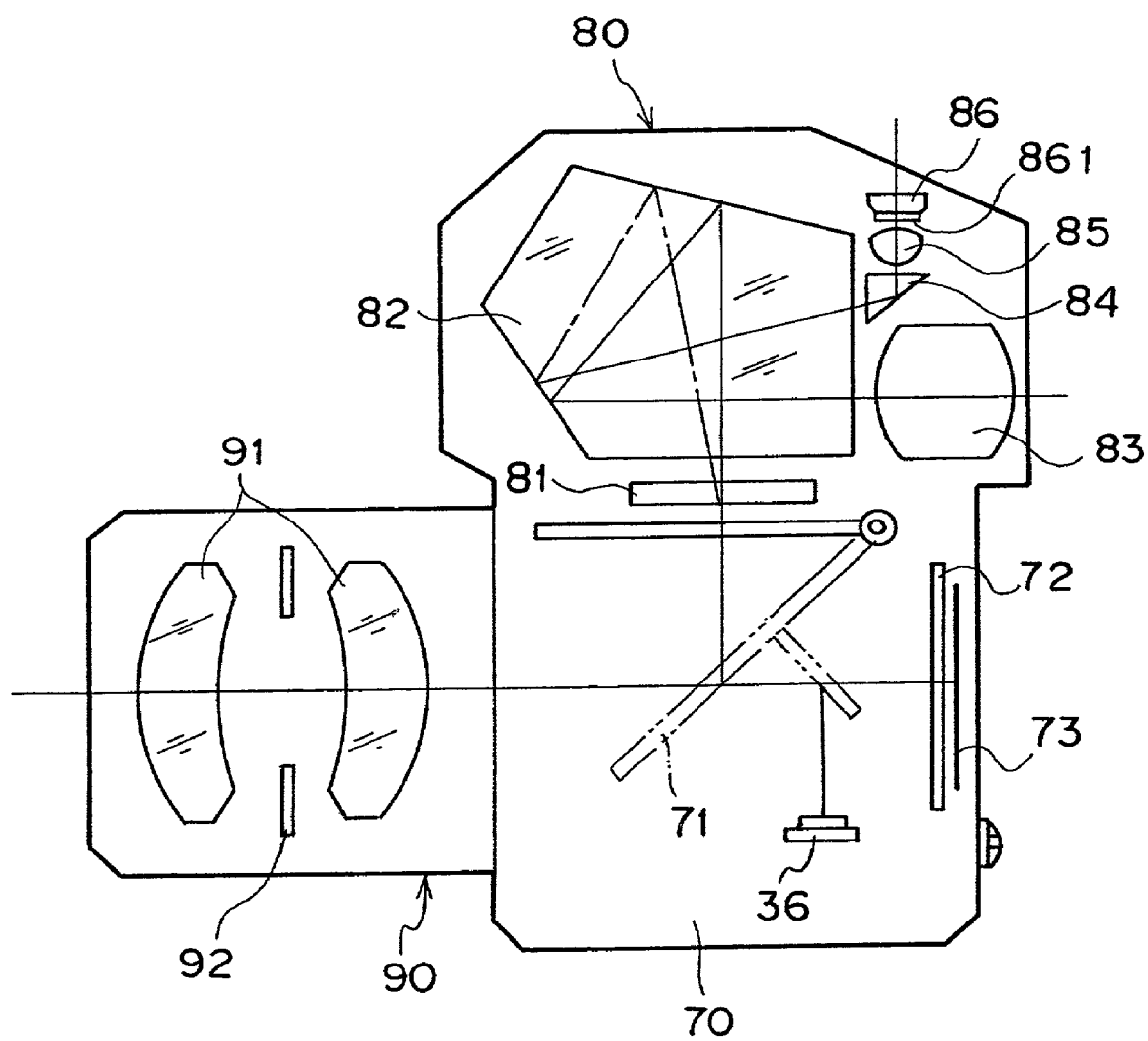
FIG. 1 shows the structure adopted in an embodiment of the single lens reflex electronic still camera.

The following is an explanation of an embodiment of the present invention, given in reference to the drawings. FIG. 1 illustrates a single lens reflex electronic still camera achieved in the embodiment of the present invention. The electronic still camera in FIG. 1 includes a camera main body 70, a viewfinder device 80 detachably mounted at the camera main body 70 and an exchangeable lens 90 that is internally provided with a lens 91 and an aperture 92 and is detachably mounted at the camera main body 70. Subject light having passed through the exchangeable lens 90 and entered the camera main body 70 is then guided to the viewfinder device 80 by a quick-return mirror 71 which is set at the position indicated by the dotted line prior to a shutter release, forms an image at a finder mat 81 and also forms an image at a focal point detection device 36. The subject light having formed the image at the finder mat 81 is then guided to an eyepiece lens 83 by a pentaprism 82, and is also allowed to pass through a prism 84 and an image-forming lens 85 to reach a white balance sensor 86 on which a subject image is formed. Following the shutter release, the quick-return mirror 71 swings to the position indicated by the solid line and the subject light forms an image on a photographic image-capturing device 73 via a shutter 72. It is to be noted that the white balance sensor 86 is arranged at a position which is conjugate with the image-capturing device 73 relative to the photographic lens 91.

Figure 2:
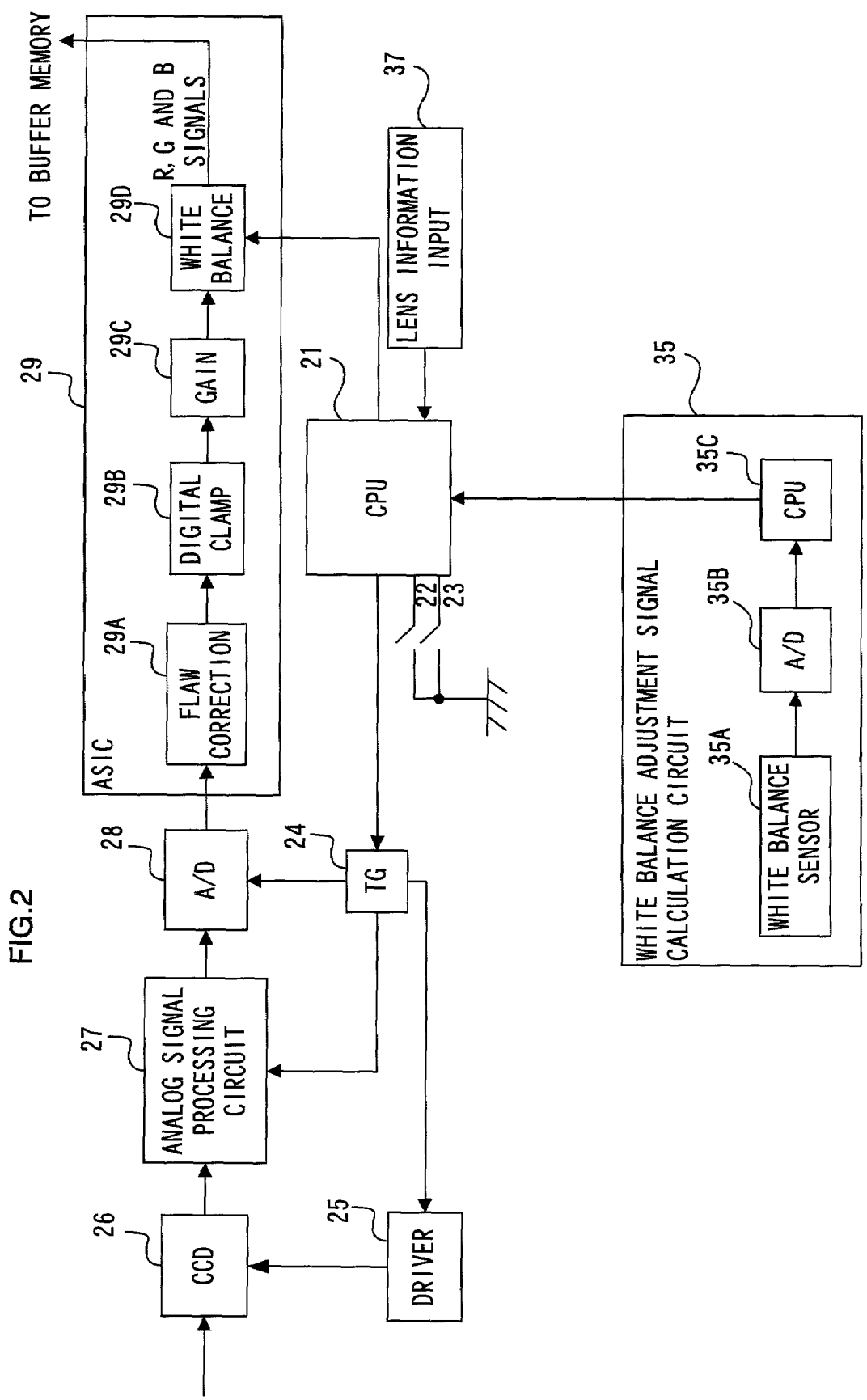
FIG. 2 is a block diagram schematically illustrating the structure of the electronic still camera.

FIG. 2 is a block diagram schematically illustrating the structure of the electronic still camera. A half-stroke signal and a full-stroke signal are input to a CPU 21 respectively from a half-stroke switch 22 and a full-stroke switch 23 which interlock with a shutter release button. The focal point detection device 36 (see FIG. 1) detects the focal adjustment state at the photographic lens 91 in response to a command issued by means of the CPU 21. The CPU 21 drives a lens drive device (not shown) in correspondence to the focal adjustment state to move the lens 91 to a focus position so that the subject light entering the exchangeable lens 90 forms an image in focused state on a CCD 26 of the image-capturing device 73. In addition, the CPU 21 drives a timing generator 24 and a driver 25 and implements drive control on the CCD 26 of the image-capturing device 73. The timing with which an analog processing circuit 27 and an A/D conversion circuit 28 are engaged in operation is controlled by the TG (timing generator) 24. A lens information input circuit 37 provides setting information with regard to the exchangeable lens 90 such as the focal length and the aperture value to the CPU 21.

When the full-stroke switch 23 is turned on after an ON operation at the half-stroke switch 22, the quick-return mirror 71 swings upward and the subject light from the exchangeable lens 90 forms an image on the light-receiving surface of the CCD 26. The CCD 26 accumulates a charge in correspondence to the brightness of the subject image. The charge accumulated at the CCD 26 is swept out by the driver 25 and is then input to the analog processing circuit 27, which includes an AGC circuit, and a CDS circuit. The analog image signal thus input undergoes analog processing such as gain control, noise removal and the like at the analog processing circuit 27 and then is converted to a digital signal at the A/D conversion circuit 28. The digitized image signal is supplied to an image-processing CPU 29 which may be constituted as, for instance, an ASIC to undergo image preprocessing including white balance adjustment, contour correction and gamma control to be detailed later.

The image data having undergone the image preprocessing further undergo format processing for JPEG compression, and the image data having undergone the format processing are output to a buffer memory (not shown) for storage. The image data stored in the buffer memory are compressed at a predetermined rate through the JPEG method or the like at a compression circuit (not shown) and are then recorded into a recording medium (not shown).

The white balance adjustment is performed at the image-processing CPU 29. Image signals corresponding to R, G and B colors output from the A/D conversion circuit 28 first undergo flaw correction at a flaw correction circuit 29A and then undergo clamp processing at a digital clamp circuit 29B. A gain circuit 29C applies a specific gain to the image signals having undergone the clamp processing, and then the image signals are input to a white balance circuit 29D. The white balance circuit 29D multiplies the R-color image signal and the B-color image signal with respect to the R, G and B color image signals respectively by an R-gain and a B-gain calculated based upon a white balance adjustment signal. These white balance adjustment R-gain and B-gain are determined at a white balance adjustment signal calculation circuit 35, are transferred to the CPU 21 and stored at a register within the CPU 21 in advance.

The white balance adjustment signal calculation circuit 35 includes a white balance sensor 35A (corresponds to 86 in FIG. 1) that detects the subject color, and A/D conversion circuit 35B that converts an analog color signal output by the white balance sensor 35A to a digital color signal and a CPU 35C that generates a white balance adjustment signal based upon the digital color signal resulting from the conversion. The CPU 35C generates the white balance adjustment R-gain and the white balance adjustment B-gain based upon the color signals detected by the white balance sensor 86 and transfers the gains to the CPU 21. The setting information with regard to the exchangeable lens 90 is input to the CPU 35C via the CPU 21.

In the embodiment the CPU 35C generates three sets of white balance adjustment basic signals through three different generating methods and calculates white balance adjustment signals by individually weighting the three sets of white balance adjustment basic signals in conformance to the photographic scene. Then, the image-processing CPU 29 performs a white balance adjustment using the three sets of white balance adjustment signals having been weighted by the CPU 35C.

Figure 3:
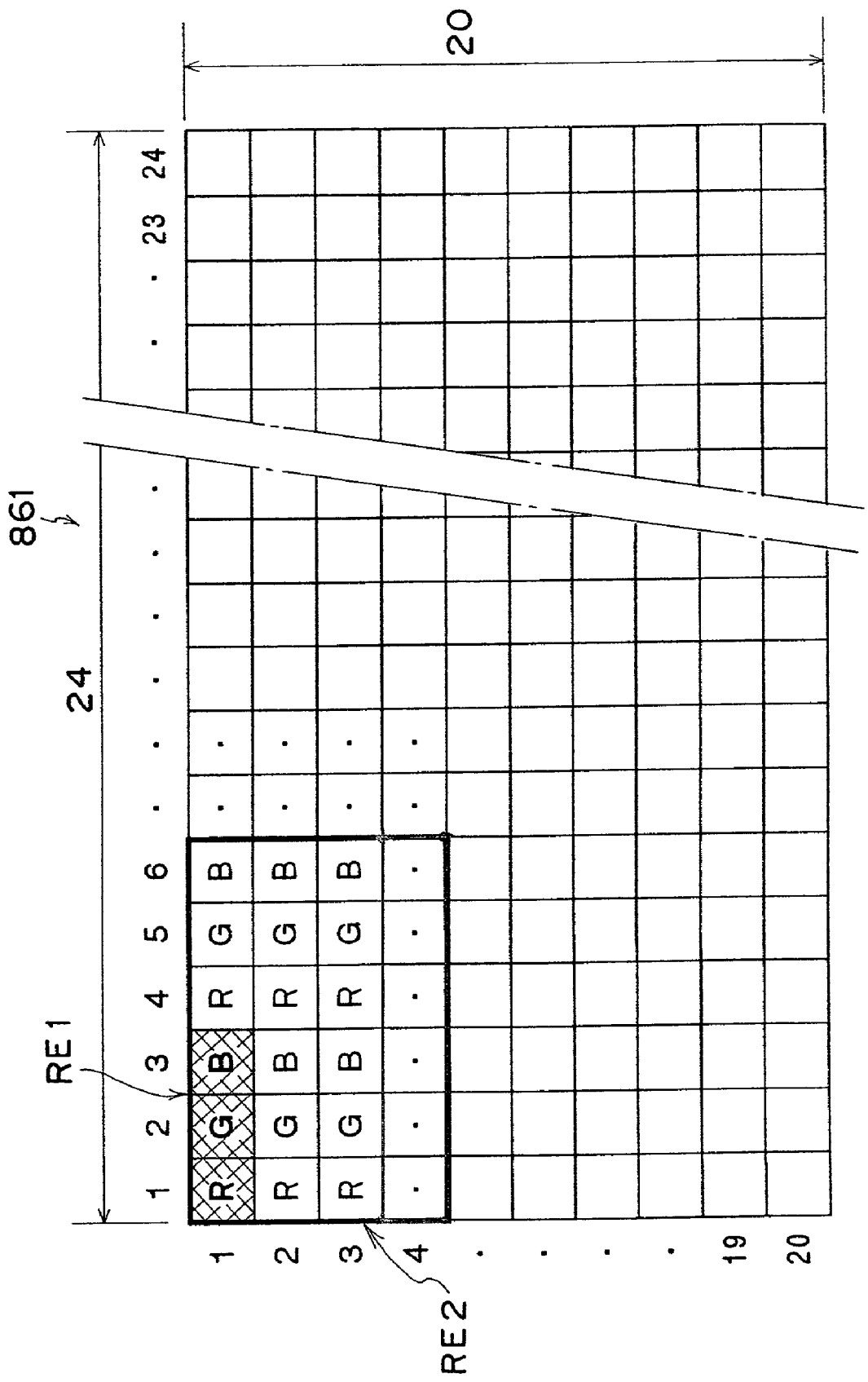
FIG. 3 is an illustration of the white balance sensor.

The white balance sensor 86 is constituted of a single two-dimensional image-capturing element having, for instance, 480 separate pixels arrayed along 24 columns (across)×20 rows (down) as illustrated in FIG. 3. At the surface of the image-capturing element 86, a color filter 861 having R, G and B color filters each provided in correspondence to one of the 480 pixels is provided. With the subject light captured at the white balance sensor 86 through the color filter 861, an image of the subject light which is separated into R-color signals, G-color signals and B-color signals is captured. Color signals for 160 pixels along, for instance, 8 columns (across)×20 rows (down), with each pixel constituted of three adjacent pixels that output an R-color signal, a G-color signal and a B-color signal, are output from the white balance sensor 86. In other words, the color signals are output from small areas obtained by dividing the image-capturing surface of the white balance sensor 86 into 160 portions. The image-capturing surface of the white balance sensor 86 is constituted so as to receive the optical image of the entire photographic field. In addition, the color signals output from the white balance sensor 86 are utilized when calculating the subject brightness as well.

Using the color signals output from the white balance sensor 86, white balance adjustment basic signals CT1~CT3 are calculated through three different methods. In the embodiment, the white balance adjustment basic signals are calculated through the following three methods.

1. White Balance Adjustment Signal Calculating Method Achieved by Averaging the Entire Image Plane.

A white balance adjustment basic signal is calculated so as to set the average value of the 160 sets of color signals output from the 160 areas at the white balance sensor 86 to an achromatic color, i.e., so as to set the average value of the color signals over the entire image plane captured at the white balance sensor 86 to an achromatic color. The CPU 35C calculates the averages of the ratios R/G of the R-color signals and the G-color signals and the ratios B/G of the B-color signals and the G-color signals with respect to the R, G and B color signals from the 160 individual areas at the white balance sensor 86 through the following formulae (1) and (2).

$$\frac{1}{160}\sum_{i=1}^{160} Fi(R/G) \qquad (1)$$

$$\frac{1}{160}\sum_{i=1}^{160} Fi(B/G) \qquad (2)$$

with Fi (R/G) representing the ratio of the R signal and the G signal at a target pixel i on the white balance sensor 86 and Fi (B/G) representing the ratio of the B signal and the G signal at the target pixel i on the white balance sensor 86.

The CPU 35C calculates a white balance adjustment basic signal so that the results of a calculation performed by using formulae (1) and (2) above both indicate a value of 1. Consequently, a white balance adjustment basic signal CT1 is calculated so as to set the color obtained by averaging all the 160 areas closer to white.

2. White Balance Adjustment Signal Calculating Method Achieved through Multiple Division White Detection The 160 areas (each representing an area RE1 in FIG. 3 constituted of 1 (row)×3 (columns) of pixels) at the white balance sensor 86 are grouped into, for instance, 4 (along the horizontal direction)×5 (along the vertical direction)=20 small areas (each representing an area RE2 in FIG. 3 constituted of 4 (rows)×6 (columns) pixels). Each small area RE2 in this case is constituted of 2 RE1s (along the horizontal direction)×4 RE1 (along the vertical direction)=8 RE1s. For each of the 20 small areas RE2, the average of the 8 sets of color signals individually output from the 8 areas RE1 contained within the small area RE2 is calculated, and then, a small area RE2 having a color signal average value within a predetermined range and thus assumed to indicate white is extracted. Next a white balance adjustment basic signal is calculated so as to set the average value of the color signals in the extracted small area RE2 assumed to indicate white even closer to white. The following is a detailed explanation of the process.

The CPU 35C calculates the averages of the ratios R/G of the R-color signals and the G-color signals and the ratios B/G of the B-color signals and the G-color signals in each of the 20 small areas RE2 with respect to the R, G and B color signals from the white balance sensor 86 through the following formulae (3) and (4).

$$\frac{1}{8}\sum_{j=1}^{8} Fj(R/G) \qquad (3)$$

$$\frac{1}{8}\sum_{j=1}^{8} Fj(B/G) \qquad (4)$$

with Fj (R/G) representing the ratio of the R signal and the G signal at a target pixel j in each small area and Fj (B/G)

representing the ratio of the B signal and the G signal at the target pixel j in each small area.

The CPU 35C uses the 8 sets of R/G and B/G calculated through formulae (3) and (4) above to detect a small area RE2W assumed to indicate white with its values falling within ranges expressed below in (5) and (6), for instance.

$$0.9 < Fj(R/G) < 1.1 \tag{5}$$

$$0.9 < Fj(B/G) < 1.1 \tag{6}$$

Once a small area RE2W that satisfies the two expressions is detected, the CPU 35C calculates the averages of the ratios R/G of the R-color signals and the G-color signals and the ratios B/G of the B-color signals and the G-color signals by using all the color signals contained in the small area RE2W through the following formulae (7) and (8). m represents the quantity of small areas RE2W that have been detected.

$$\frac{1}{m} \sum_{k=1}^{m} Fk(R/G) \tag{7}$$

$$\frac{1}{m} \sum_{k=1}^{m} Fk(B/G) \tag{8}$$

with Fk (R/G) representing the ratio of the R signal and the G signal at of target pixel k within the small area satisfying the expressions (5) and (6) above and Fk (B/G) representing the ratio of the B signal and the G signal at the target pixel k within the small area satisfying the expressions (5) and (6).

The CPU 35C calculates a white balance adjustment basic signal so that the results of a calculation performed by using formulae (7) and (8) both indicate a value of 1. Consequently, a basic signal CT2 is calculated so as to set the color obtained by averaging the small areas RE2W assumed to indicate white even closer to white.

3. White Balance Adjustment Signal Calculating Method Achieved through Multiple Division Skin Color Detection The average value of the 8 sets of color signals individually output from the 8 areas RE1 within, for instance, each of the 20 small areas RE2 mentioned above is calculated to extract a small area RE2S having a color signal average value within a predetermined range and assumed to indicate skin color. Then, a white balance adjustment basic signal is calculated so as to set the color signal average value of the extracted small area RE2S assumed to indicate skin color even closer to skin color.

The CPU 35C calculates the averages of the ratios R/G of the R-color signals and the G-color signals and the ratios B/G of the B-color signals and the G-color signals in each of the 20 small areas RE2 with respect to the R, G and B color signals from the white balance sensor 86 through the formulae (3) and (4) presented earlier. The CPU 35C uses the 8 sets of R/G and B/G signals calculated through formulae (3) and (4) above to detect a small area RE2S assumed to indicate skin color with its values falling within ranges expressed below in (9) and (10).

$$0.9 < Fj(R/G) < 1.1 \tag{9}$$

$$0.7 < Fj(B/G) < 0.9 \tag{10}$$

Once a small area RE2S that satisfies the two expressions is detected, the CPU 35C calculates the averages of the ratios R/G of the R-color signals and the G-color signals and the ratios B/G of the B-color signals and the G-color signals by using all the color signals contained in the small area RE2S through the formulae (7) and (8) presented earlier.

The CPU 35C calculates a white balance adjustment basic signal so that the results of calculation performed by using formulae (7) and (8) respectively indicate a value of 1 and a value of 0.8. Consequently, a white balance adjustment basic signal CT3 is calculated so as to set the color obtained by averaging the signal values in the small area RE2S assumed to indicate skin color even closer to skin color.

Figure 4:
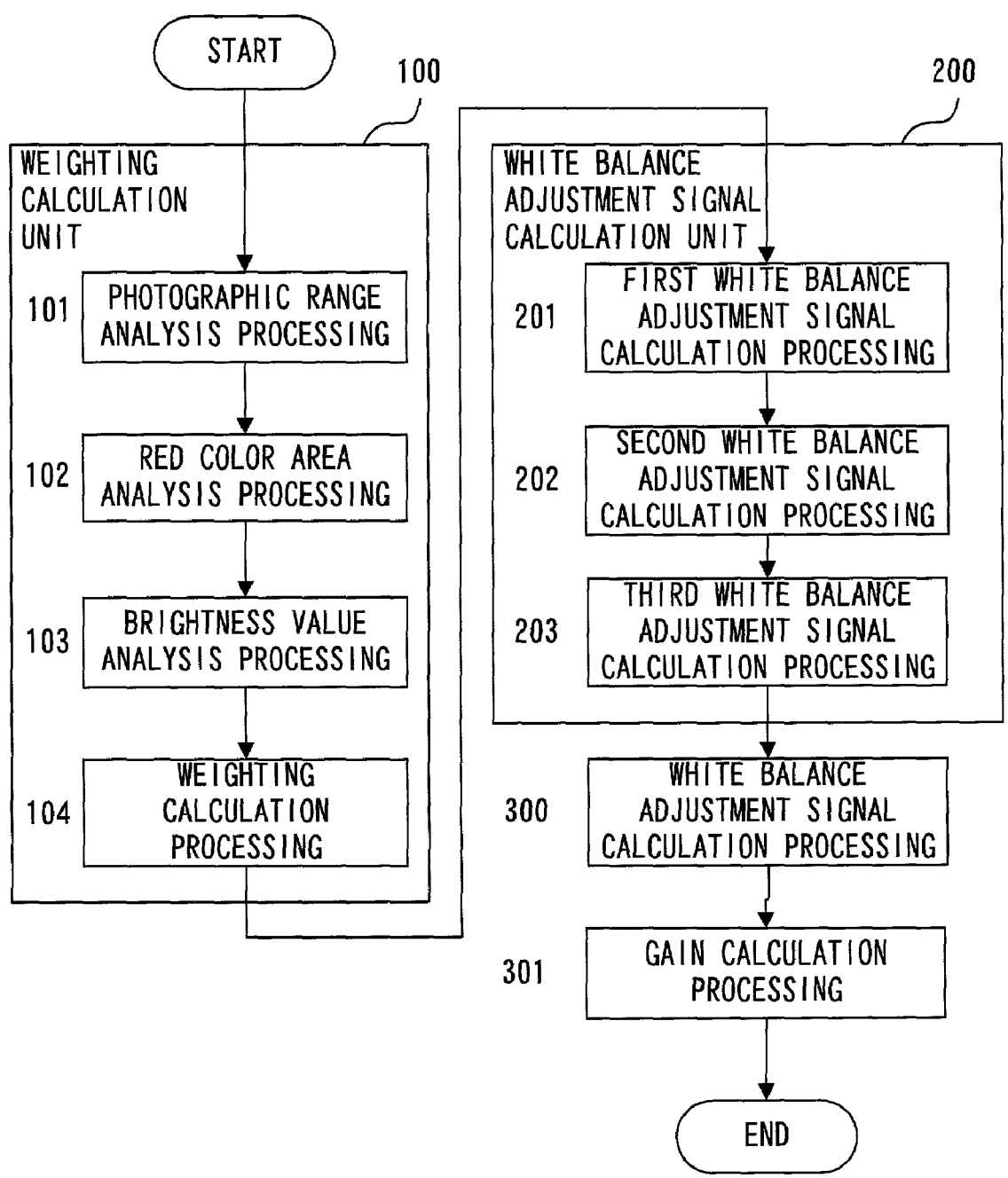
FIG. 4 is a flowchart of the processing for generating a white balance adjustment signal.

Three weighting points Sp1~Sp3 are provided as explained below for each of the three sets of white balance adjustment basic signals CT1~CT3 calculated as explained above, and three weighting values a1~a3 are calculated by normalizing the weighting points Sp1~Sp3. The three sets of white balance adjustment basic signals CT1~CT3 are respectively multiplied by the three weighting values a1~a3 thus calculated, and the three sets of white balance adjustment signals resulting from the multiplication operations are added together to obtain a white balance adjustment signal CT to be used in the white balance adjustment. FIG. 4 is a flowchart of the processing implemented to generate the white balance adjustment signal CT in the embodiment. The processing in FIG. 4 is implemented in two primary units, i.e., a weighting calculation unit 100 and a white balance adjustment signal calculation unit 200, and is repeatedly executed prior to a shutter release at the electronic still camera. The weighting calculation unit 100 analyzes a scene being photographed and calculates the three weighting values a1~a3 for the three sets of white balance adjustment basic signals CT1~CT3. The white balance adjustment signal calculation unit 200 individually calculates the three individual sets of white balance adjustment basic signals CT1~CT3 as described earlier.

The weighting calculation unit 100 implements three different scene analyses, i.e., photographic range analysis processing in step S101, red color area analysis processing in step S102 and brightness analysis processing in step S103, and calculates weighting points Sp1~Sp3 through the individual analyses. In weighting calculation processing implemented in step S104, the weighting points Sp1~Sp3 calculated through the individual analyses are normalized to calculate the weighting values a1~a3.

-First Scene Analysis-

In step S101 in FIG. 4, the CPU 35C calculates the first weighting points in conformance to the focal length of the photographic lens 91 and the photographing distance. The photographing distance between the subject and the camera is obtained by performing a specific arithmetic operation using the information indicating the position of the focus lens of the photographic lens 91 having been driven to the focus position. The focal length set at the photographic lens 91 and the focus lens position information are input to the CPU 35C via the CPU 21. Once the focal length of the photographic lens 91 and the photographing distance are ascertained, the range over which an image is photographed, i.e., the photographic range, can be estimated. The CPU 35C calculates the weighting points for the three sets of white balance adjustment basic signals in conformance to the estimated photographic range.

Each of FIGS. 5A–5C shows a table of the first weighting points calculated in step S101. Weighting points are set for the three different white balance adjustment signal calculating methods described earlier, in correspondence to a given set of the focal length and the photographing distance. The first weighting point calculated through the photographic range analysis in step S101 has the following characteristics.

As shown in FIG. 5A, the white balance adjustment signal calculating method achieved by averaging the color signals over the entire image plane assumes that various colors are evenly distributed within the photographic image plane. Under normal circumstances, the likelihood of the various colors contained in the photographic image plane is high when the photographic range is large and the likelihood of the various colors contained in the photographic image plane is lowered as the photographic range becomes smaller. Accordingly, the first weighting point is set to 0 if the photographic range is large (the focal length is small and the photographing distance is large) and a negative value is set for the first weighting point when the photographic range is small (the focal length is large and the photographing distance is small) The weight of the weighting point increases as the absolute value of a positive value increases and becomes smaller as the absolute value of a negative value increases.

As shown in FIG. 5B, in the white balance adjustment signal calculating method achieved through multiple division white detection, it is assumed that white (an achromatic color) is contained somewhere within the photographic image plane. Generally speaking, the likelihood of an achromatic color contained in the photographic image plane is not greatly dependent upon the photographic range. Accordingly, the first weighting point is set to 0 regardless of the focal length setting and the photographing distance.

As shown in FIG. 5C, the white balance adjustment signal calculating method achieved through multiple division skin color detection assumes that skin color is contained somewhere within the photographic image plane. Under normal circumstances, the color of the skin of a person is distributed over a specific range. For instance, when utilizing a lens with an 85 mm focal length for a portrait photographing operation, the photographing distance is often set to 1~2 m. In this case, the color of the skin of the person constituting the main subject does not cover the entire photographic image plane, or the area of the skin color is not too small to make the facial features of the person indiscernible. Accordingly, a positive value is set for the first weighting point only when a specific relationship is achieved between the focal length and the photographing distance and otherwise, a negative value is set for the first weighting point.

-Second Scene Analysis-

Instep S102 in FIG. 4, the CPU 35C calculates the second weighting points in correspondence to the number of red color signals output from the white balance sensor 86. The ratios R/G of the R-color signals and the G-color signals and the ratios B/G of the B-color signals and the G-color signals with respect to the R, G and B color signals in the 160 individual areas RE1 at the white balance sensor 86 are calculated and the 160 sets of data are plotted on the chromaticity coordinate plane shown in FIG. 6. In FIG. 6, the horizontal axis represents R/G and the vertical axis represents B/G. The 160 sets of data are plotted on the chromaticity coordinate plane and the number of sets of data in the first quadrant of the coordinate system in FIG. 6 is counted for red color hue data. The CPU 35C calculates the subject brightness by using the color signals and calculates the weighting points for the three sets of white balance adjustment basic signals in conformance to the number of sets of red color data and the subject brightness. It is to be noted that the relationship between the color signal level and the subject brightness value BV is stored in advance as a table at the CPU 35C, and that the subject brightness value BV is read out from the table by using the color signal level as an argument Each of FIGS. 7A–7F shows a table of the second weighting points calculated in step S102. Weighting points are set for the three different white balance adjustment signal calculating methods described above in correspondence to a given set of the number of sets of red color data and subject brightness value BV. The second weighting points calculated through the red color area analysis in step S102 have the following characteristics. When numerous sets of red color data are present, it is difficult to distinguish red color data attributable to a light source from red color data attributable to a red subject photographed over a significant area. However, such distinction may be made possible by detecting the subject brightness at the same time. For instance, if the subject brightness value BV is equal to or larger than 7, it can be safely assumed that there is hardly any chance of a light source with a red hue being present. Accordingly, if the subject achieves a high level of brightness and numerous sets of red color data are present, the color of the subject can be assumed to be predominantly red. The white balance adjustment signal calculating method achieved by averaging the color signals over the entire image plane, which assumes that various colors are evenly distributed in the photographic image plane, is not suitable in a situation in which the color of the subject is predominantly red. For this reason, a negative value with a large absolute value is set as the second weighting point for the white balance adjustment signal calculating method achieved by averaging the color signals over the entire image plane if there are numerous sets of red color data present. Each of FIGS. 7A–7B shows an example of the second weighting points for the white balance adjustment signal calculating method achieved by averaging the color signals over the entire image plane.

In the white balance adjustment signal calculating method achieved through multiple division white detection and the white balance adjustment signal calculating method achieved through multiple division skin color detection, adjustment signals can be calculated by detecting white color and skin color respectively even when a great deal of red color is present in the background, for instance. Accordingly, since the predominance of red color in the subject does not present a problem as it does in the white balance adjustment signal calculating method achieved by averaging the color signals over the entire image plane, 0 or a positive/negative value with a small absolute value is set as the second weighting points in correspondence to the white balance adjustment signal calculating method achieved through multiple division white detection and the white balance adjustment signal calculating method achieved through multiple division skin color detection. Tables shown in FIGS. 7C and 7D, FIGS. 7E and 7F show the first through the third weighting points for the white balance adjustment signal calculating method achieved through multiple division white detection, respectively.

-Third Scene Analysis-

In step S103 in FIG. 4, the CPU 35C calculates the third weighting points in correspondence of the subject brightness value BV. FIG. 8 presents a table of the third weighting points calculated in step S103. Weighting points are set for the three white balance adjustment signal calculating methods described above, in correspondence to a given subject brightness value BV. The third weighting points calculated through the brightness value analysis in step S103 have the following characteristics. It has been confirmed through experience that the likelihood of a correct white balance adjustment signal being calculated through the white balance adjustment signal calculating method by averaging the color signals over the entire image plane is low (the accuracy rate is low) when a photographing operation is performed under very bright artificial light such as a fluorescent light or a mercury lamp. Accordingly, a larger positive value is set for the third weighting point corresponding to the white balance adjustment signal calculating method achieved by averaging the color signals over the entire image plane when the brightness level is low compared to the value set when the brightness value is high.

It has been confirmed through experience that the accuracy rate of the white balance adjustment signal calculating method achieved through multiple division skin color detection is low when a photographing operation is performed under low bright artificial light. Accordingly, a smaller value is set for the third weighting point corresponding to the white balance adjustment signal calculating method achieved through multiple division skin color detection when the brightness level is low compared to the value set when the level of the brightness is high.

In step S104 in FIG. 4, the CPU 35C calculates the weighting values a1~a3 through the following formulae (11)~(13) by normalizing the first~third weighting points calculated in steps S101~S103 as explained above.

$$a1 = \frac{\sum Sp1}{\sum Sp1 + \sum Sp2 + \sum Sp3} \quad (11)$$

$$a2 = \frac{\sum Sp2}{\sum Sp1 + \sum Sp2 + \sum Sp3} \quad (12)$$

$$a3 = \frac{\sum Sp3}{\sum Sp1 + \sum Sp2 + \sum Sp3} \quad (13)$$

with each Sp1 representing the weighting point for the white balance adjustment signal calculating method achieved by averaging the color signals over the entire image plane calculated in step S101, S102 or S103, and each Sp2 representing the weighting point for the white balance adjustment signal calculating method achieved through multiple division white detection calculated in step S101, S102 or S103 and each Sp3 representing the weighting point for the white balance adjustment signal calculating method achieved through multiple division skin color detection calculated in step S101, S102 or S103. In addition, a1, a2 and a3 respectively represent the weighting values for the white balance adjustment signal calculating method achieved by averaging the color signals over the entire image plane, the white balance adjustment signal calculating method achieved through multiple division white detection and the white balance adjustment signal calculating method achieved through multiple division skin color detection, obtained through the normalization. 0 is set for any of the terms in formulae (11)~(13), in which a negative value results from the calculation.

In step S201 in FIG. 4, the CPU 35C calculates the white balance adjustment basic signal CT1 through the white balance adjustment signal calculating method achieved by averaging the color signals over the entire image plane as described above and the operation then proceeds to step S202. In step S202, the CPU 35C calculates the white balance adjustment basic signal CT2 by implementing the white balance adjustment signal calculation method through multiple division white detection as described earlier, and then the operation proceeds to step S203. In step S203, the CPU 35C calculates the white balance adjustment basic signal CT3 by implementing the white balance adjustment signal calculation method through multiple division skin color detection as described earlier, and then the operation proceeds to step S300. Individual operations in S201–S203 are termed the first through the third white balance adjustment signal calculation operations.

In step S300, the CPU 35C calculates a white balance adjustment signal CT to be used in the white balance adjustment through the following formula (14) with the white balance adjustment basic signals CT1~CT3.

$$CT = a1 \cdot CT1 + a2 \cdot CT2 + a3 \cdot CT3 \quad (14)$$

with CT1 representing the adjustment signal calculated through the white balance adjust signal calculating method achieved by averaging the color signals over the entire image plane in step S201, CT2 representing the adjustment signal obtained by implementing the white balance adjustment signal calculating method through multiple division white detection in step S202 and CT3 representing the adjustment signal obtained by implementing the white balance adjustment signal calculating method through multiple division skin color detection in step S203. The white balance adjustment signal and the white balance adjustment basic signals are each constituted of a single value, i.e., CT, CT1, CT2 or CT3. These signal values are equivalent to, for instance, color temperature values, mired values or the like.

In step S301, the CPU 35C converts the value of the white balance adjustment signal CT calculated through formula (14) to an R-gain value and a B-gain value. The relationship between the white balance adjustment signal CT, and the R-gain and the B-gain is stored in the memory of the CPU 35C in advance as a table, and the R-gain and the B-gain are read out from the table by using the calculated CT value as an argument. The CPU 35C provides the R-gain and the B-gain to the CPU 21 and then the processing in FIG. 4 ends.

The R-gain and the B-gain provided to the CPU 21 are then transmitted to the white balance circuit 29D mentioned earlier where they are used during a white balance adjustment performed by the white balance circuit 29D on image data obtained through a subsequent image-capturing operation performed at the CCD 26. The white balance adjustment is achieved by incorporating the R-signals and the B-signals over the entire range where the image-capturing operation is performed by the CCD 26 with the R-gain and the B-gain, bearing no relation to the color signal detection areas corresponding to the 160 pixels at the white balance sensor 86.

Now, the features of the embodiment are summarized.

(1) The white balance adjustment basic signal CT1 is calculated through the white balance adjustment signal calculating method achieved by averaging the color signals over the entire image plane with the color signal output from the white balance sensor 86 which corresponds to 160 pixels. Thus, a white balance adjustment basic signal CT1, which will set the color obtained by averaging the color signals from all the 160 areas even closer to white, is obtained through the calculation.

(2) The light-receiving areas corresponding to 160 pixels at the white balance sensor 86 are grouped into a total of 20 small areas RE2, and the average of the 8 sets of color signals individually output from the 8 areas RE1 contained in each of the 20 small areas RE2 is calculated. Then, a small area RE2W achieving a color signal average value within a predetermined range and assumed to indicate white is extracted, and a white balance adjustment basic signal CT2 which will set the average value of the color signals in the extracted small area RE2W even closer to white is calculated. As a result, a white balance adjustment basic signal CT2 which will set white color detected in a portion of the photographic image plane even closer to white is obtained through the calculation.

(3) The light-receiving areas corresponding to 160 pixels at the white balance sensor 86 are grouped into a total of 20 small areas RE2, and the average of the 8 sets of color signals individually output from the 8 areas RE1 contained in each of the 20 small areas RE2 is calculated. Then, a small area RE2S achieving a color signal average value within a predetermined range and assumed to indicate skin color is extracted, and a white balance adjustment basic signal CT3 which will set the average value of the color signals in the extracted small area RE2S even closer to skin color is calculated. As a result, a white balance adjustment basic signal CT3 which will set skin color detected in a portion of the photographic image plane even closer to skin color is obtained through the calculation.

(4) The photographic range is estimated based upon the focal length set at the photographic lens 91 and the photographing distance, and the first weighting points are provided each in correspondence to one of the white balance adjustment basic signals CT1~CT3 calculated through the calculating methods described in (1)~(3) above in conformance to the photographic range. By setting a high weighting point for the skin color detection method in (3) above if the photographic range is suited for a portrait photographing operation, a high weighting rate is allocated to the adjustment method with a high likelihood of calculating a correct white balance adjustment signal (with a high accuracy rate). By setting a low weighting point for the skin color detection method in (3) when the photographic range is too large for a portrait photographing operation, on the other hand, an erroneous white balance adjustment can be prevented as detailed below. Namely, when there is a large achromatic color subject illuminated by a light source with a low color temperature, the level of the adjustment obtained through the skin color detection adjustment signal method is set low even if a skin color is erroneously detected through the skin color detection method, and thus, erroneous white balance adjustment which would set the achromatic color subject to skin color is prevented.

(5) The chromaticity data (R/G and B/G) for the 160 pixels at the white balance sensor 86 are plotted on a chromaticity coordinate plane and the second weighting points are provided each for one of the white balance adjustment basic signals CT1~CT3 calculated through the calculating methods in (1)~(3) above in conformance to the number of sets of red color data contained in the first quadrant and the subject brightness value BV. For instance, by setting the weighting point corresponding to the calculating method achieved by averaging the color signals over the entire image plane in (1) when the color of the subject is predominantly red, the weighting rate of the adjustment method with a low accuracy rate can be reduced. As a result, a high-quality color image is obtained.

(6) The third weighting points are provided each for one of the white balance adjustment basic signals CT1~CT3 calculated through the calculating methods in (1)~(3) above in correspondence to the subject brightness value BV. For instance, by setting a lower weighting point for the calculating method achieved by averaging the color signals over the entire image plane in (1) when a photographing operation is performed under artificial light with a high level of brightness such as a fluorescent light or a mercury lamp compared to that set when the brightness level is low, it is possible to reduce the weighting rate of the adjustment method with a low accuracy rate. As a result, a high-quality color image is obtained.

(7) The first weighting points~third weighting points calculated in (4)~(6) above are normalized to calculate the weighting values a1, a2 and a3 for the adjustment basic signals CT1, CT2 and CT3 obtained through the calculating methods in (1)~(3). As a result, the ratio of dominance of the adjustment basic signal obtained through calculating method with a high accuracy rate among a plurality of calculating methods can be increased in conformance to the type of photographic scene, regardless of the number of calculating methods employed to calculate white balance adjustment basic signals or the number of scene analyses performed to provide weighting points. At the same time, by lowering the proportion of the adjustment basic signal obtained through a calculating method with a low accuracy rate in conformance to the type of photographic scene, its influence can be eliminated.

(8) A negative value with a larger absolute value is set for the weighting point whose weighting rate is to be lowered, and thus, the extent to which the adjustment basic signal obtained through a calculating method with a low accuracy rate influences the white balance adjustment can be further reduced.

(9) Since the weighting points are provided in tables, the volume of the arithmetic operation that the CPU 35C has to execute is reduced to achieve a reduction in the length of the processing time.

(10) Since the relationship between the white balance adjustment signal CT and the R-gain and B-gain is stored in the memory at the CPU 35C as a table in advance, the length of time required for the arithmetic processing is reduced.

(11) As the white balance sensor 86 is provided within the viewfinder device 80, it is possible to provide the white balance adjustment R-gain and the white balance adjustment B-gain to the CPU 21 before the mirror 71 is raised in response to an operation of the full-stroke switch 23. Thus, since it is not necessary to calculate the white balance adjustment gains during the photographing sequence executed in response to the operation of the full-stroke switch 23, a reduction in the photographing processing time is achieved compared to the length of processing time required when calculating the white balance adjustment gains are calculated during the photographing sequence.

While an explanation is given above on an example in which the present invention is adopted in a single lens reflex electronic still camera, the present invention also may be adopted in an electronic still camera which is not a single lens reflex camera and a digital video camera capable of taking in still images in addition to dynamic images. In such a case, subject images are separately formed at the CCD 26 and the white balance sensor 86 by using a beam splitter, a half mirror and the like.

In addition, while the CCD 26 and the white balance sensor 86 are provided as components independent of each other in the explanation given above, the CCD 26 may also function as the white balance sensor 86. In such a case, the white balance adjustment gains are determined as described above by using the data obtained through an image-capturing operation at the CCD 26. Then, a white balance adjustment is implemented using the white balance adjustment gains on subject image data obtained through an image-capturing operation performed in response to a shutter release operation.

While the white balance sensor 86 is constituted of a two-dimensional image-capturing element having 480 separate pixels provided along 48 columns (across)×10 rows (down), and includes the RGB color filter 861 to output color signals for 160 pixels, the present invention may be adopted in conjunction with pixel structures other than this.

While three white balance adjustment signal calculation methods are implemented in the explanation given above, the present invention may be adapted to a white balance adjustment as long as two or more white balance adjustment signal calculating methods are employed. The present invention may be adopted when a white balance adjustment signal calculated by employing a white balance sensor internally provided at the camera and a white balance adjustment signal calculated by employing a white balance sensor provided outside are used in combination.

While an explanation is given above on an example in which white balance adjustment basic signals are calculated through 1. a white balance adjustment signal calculating method achieved by averaging the color signals over the entire image plane;
2. a white balance adjustment signal calculating method achieved through multiple division white detection; and
3. a white balance adjustment signal calculating method achieved through multiple division skin color detection, methods other than the above may be implemented, instead. For instance, a white balance adjustment signal calculating method achieved through multiple division specific color detection that detects green or sky blue may be executed. When detecting a sky blue, the likelihood of detecting sky blue is assumed to be higher over a larger photographic range. Accordingly, when the white balance adjustment signal calculating method achieved through multiple division sky blue detection is adopted, the weighting point should be raised as the photographic range becomes larger during the weighting point calculation through photographic range analysis.

While the light-receiving areas at the white balance sensor 86 are grouped into 20 areas when calculating a white balance adjustment signal through multiple division specific color detection, the number of area groups does not need to be 20.

While the photographic scene is analyzed through 1. photographic range analysis
2. red color area analysis; and
3. brightness value analysis, in the explanation given above, it is not always necessary to implement these three scene analyses, and any one of the three types of analyses above or two of the three types of analyses may be implemented. In addition, another scene analysis such as green color area analysis may be implemented.

The subject brightness value utilized in the brightness value analysis may be a brightness value obtained by averaging brightness values over the photographic image plane, a brightness value obtained by weighting the center of the photographic image plane or a brightness value corresponding to a given area within the photographic image plane.

Weighting points shown in FIGS. 5A–5C, FIGS. 7A–7F and FIG. 8 are one example. Each weighting point may be varied according to individual photographing modes such as a portrait photography and a landscape photography, etc.

The above mentioned embodiments are explained with an electronic camera, however, the present invention can be applied to an image processing apparatus constituted of a personal computer or the like that receives an image captured by an electronic camera to performs a white balance adjustment operation to the captured image. In this case, the electronic camera outputs image-capturing data, which are raw data, to a recording medium which the image-capturing data is recorded therein as it is. The recorded raw image data are transferred to the image processing apparatus that performs various operations including a detection of chromaticity of a subject, a scene analysis, a gain calculation, a weighting value calculation, a white balance adjustment gain calculation and a white balance adjustment.

An image processing apparatus may be constituted of a personal computer. In this case, control programs for aforementioned various operations are installed in the personal computer in advance. These control programs can be provided by means of data signals stored in a recording medium such as CD-ROM or received through an Internet.

Figure 9:
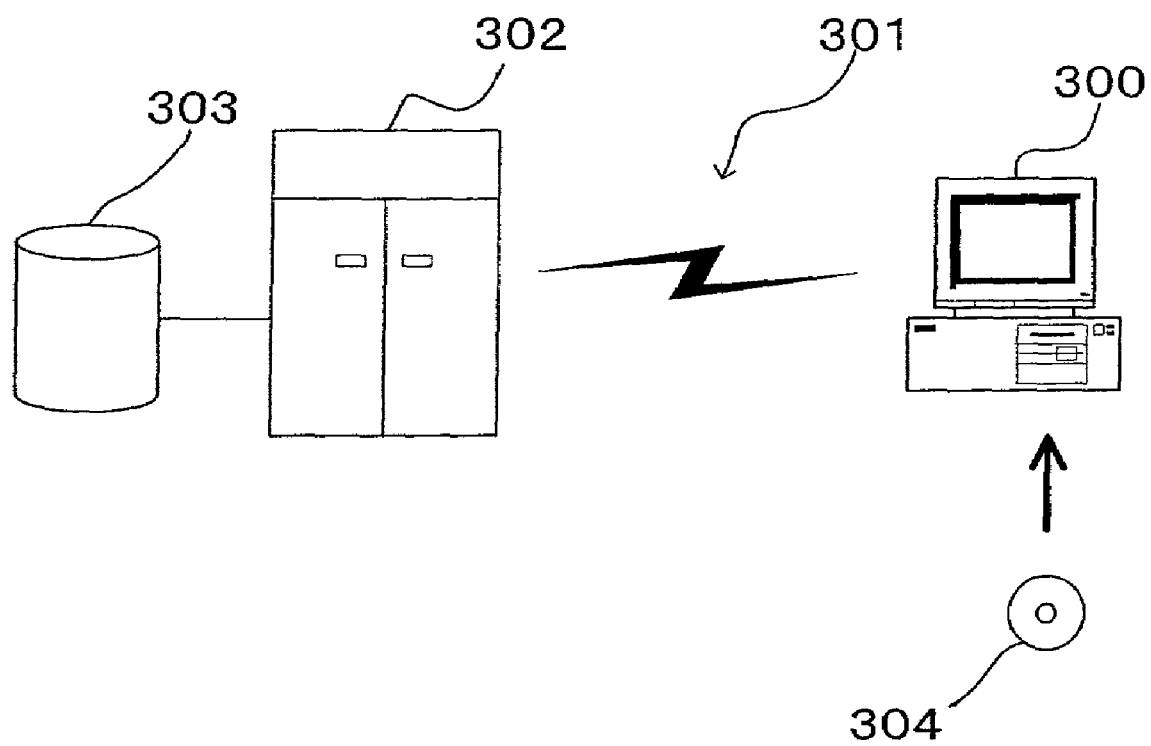
FIG. 9 is a block diagram showing an image processing apparatus to which the present invention is applied.

FIG. 9 shows an example of receiving data signals. A personal computer 300 receives a program through a CD-ROM 304. The personal computer 300 is provided with a communication device connected to a communication line 301. A computer 302 is a server computer providing the programs mentioned above and provided with a hard disc storing the programs therein. The communication line 303 may be an Internet, a personal computer communication line, an exclusive communication line and the like. The computer 302 reads out the program through the hard disc 303 and forwards the program to the personal computer 300. A program is embodied as a data signal on a carrier wave that is transmitted through the communication line 301. In this way, a program may be supplied in various types of computer readable computer program products including a recording medium, a carrier wave and the like.

The above-described embodiments are examples, and various modifications can be made without departing from the spirit and scope of the invention.

What is claimed is:

1. An electronic camera comprising:
   an image-capturing device that captures a subject image passing through a photographic lens and outputs an image-capturing signal;
   a chromaticity detection unit that detects chromaticity of the subject by using the image-capturing signal;
   a calculation unit that calculates first and second values representing color temperature or mired value by using different algorithms, each of which corresponds to respective gains, based upon the chromaticity detected by the chromaticity detection unit;
   a scene analysis unit that analyzes a scene to be photographed,
   a weighting value calculation unit that calculates first and second weighting values, each for the first and second values representing color temperature or mired value, based on results of analyzing the scene;
   a gain calculation unit that calculates a white balance adjustment gain for the image-capturing signal based upon the first and second values representing color temperature or mired value to which the first and second weighting values have been applied respectively; and
   a white balance adjustment unit that performs a white balance adjustment by applying the white balance adjustment gains to the image-capturing signal.

2. An electronic camera according to claim 1, wherein:
the weighting value calculation unit calculates the weighting values so as to give dominance to either the first value representing color temperature or mired value or the second value representing color temperature or mired value.

3. An electronic camera according to claim 2, wherein:
the weighting value calculation unit weights the first value representing color temperature or mired value and the second value representing color temperature or mired value by providing different coefficients for the first value representing color temperature or mired value and the second value representing color temperature or mired value, with a positive coefficient set for one of the values representing color temperature or mired value that is to be given dominance and a negative coefficient with a larger absolute value than the positive coefficient provided for the other value representing color temperature or mired value.

4. An electronic camera according to claim 1, wherein:
the weighting value calculation unit includes a table of a relationship between results of analyzing the scene being photographed and the weighting values.

5. An electronic camera according to claim 1, wherein:
the calculation unit calculates the first value representing color temperature or mired value by using a white balance adjustment signal calculating method achieved by averaging color signals over an entire image plane and the second value representing color temperature or mired value by using a white balance adjustment signal calculating method achieved through multiple division white detection,
the calculation unit further calculates a third value representing color temperature or mired value by using a white balance adjustment signal calculating method achieved through multiple division skin color detection,
the scene analysis unit analyzes a scene to be photographed by using a photographic range analysis method, a red color area analysis method and a brightness value analysis method, respectively,
the weighting value calculation unit calculates the first weighting value for the first value representing color temperature or mired value and the second weighting value for the second value representing color temperature or mired value,
the weighting value calculation unit further calculates a third weighting value for the third value representing color temperature or mired value for each of the analysis methods for the individual results of analyzing the scene, and
the gain calculation unit calculates the white balance gain to the image-capturing signals based upon the first value representing color temperature or mired value to which the first weighting value has been applied, the second value representing color temperature or mired value to which the second weighting value has been applied and the third value representing color temperature or mired value to which the third weighting value has been applied.

6. An electronic camera according to claim 1, wherein:
the scene analysis unit analyzes the scene to be photographed based on an output signal, both the output signal and the image-capturing signal are obtained from an imaging device for photography and the image-capturing signal is processed with the white balance adjustment.

7. An electronic camera according to claim 1, wherein:
the image-capturing signal is obtained from a first imaging device that outputs the image-capturing signal to be processed with the white balance adjustment and an output signal is obtained from a second imaging device, and
the output signal from the second imaging device is used by the scene analysis unit to analyze the scene to be photographed.

8. A white balance adjustment, method comprising:
detecting chromaticity of a subject by using an image-capturing signal of an image of the subject that has been photographed,
calculating first and second values representing color temperature or mired value by using different algorithms, based upon the detected chromaticity of the subject,
analyzing a scene to be photographed,
calculating first and second weighting values, each for the first and second values representing color temperature or mired value, based on analyzing the scene, and
calculating a gain for white balance adjustment by the first and second values and the first and second weighting values.

9. A computer-readable computer program product containing a control program for white balance adjustment, the control program comprising:
an instruction for detecting chromaticity of a subject by using an image-capturing signal of an image of the subject that has been photographed,
an instruction for calculating first and second values representing color temperature or mired value by using different algorithms, based upon the chromaticity of the subject detected in response to the detection instruction,
an instruction for analyzing a scene to be photographed, and
an instruction for calculating first and second weighting values, each for the first and second values representing color temperature or mired value, based on analyzing the scene, wherein
a gain for white balance adjustment is calculated by the first and second values and the first and second weighting values, wherein:
the program product comprises a recording medium.

* * * * *